Figure 1:
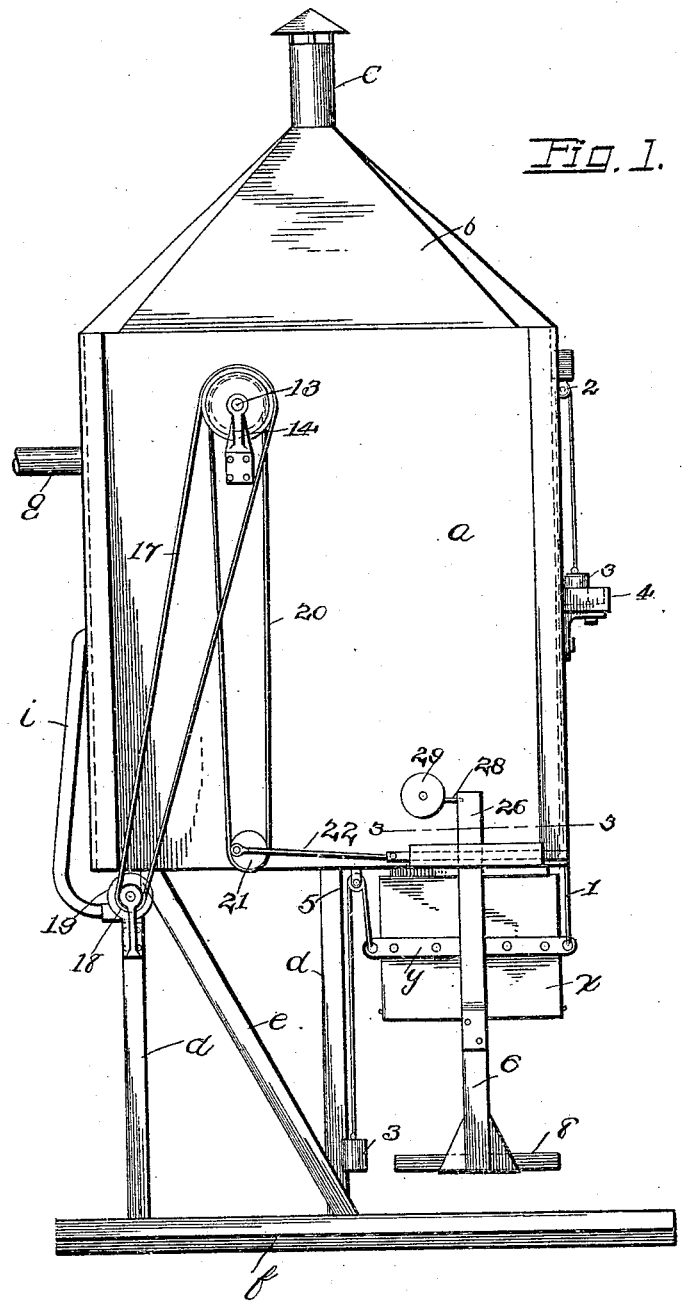

J. BROUSSARD.
COTTON SEED PACKER.
APPLICATION FILED OCT. 15, 1908. RENEWED OCT. 14, 1909.

951,051.

Patented Mar. 1, 1910.
3 SHEETS—SHEET 1.

Witnesses
Jas. E. Dodge
W. May. Duvall

Inventor
James Broussard.
By Wilkinson, Fisher & Witherspoon
Attorneys

J. BROUSSARD.
COTTON SEED PACKER.
APPLICATION FILED OCT. 15, 1908. RENEWED OCT. 14, 1909.
951,051.
Patented Mar. 1, 1910.
3 SHEETS—SHEET 2.
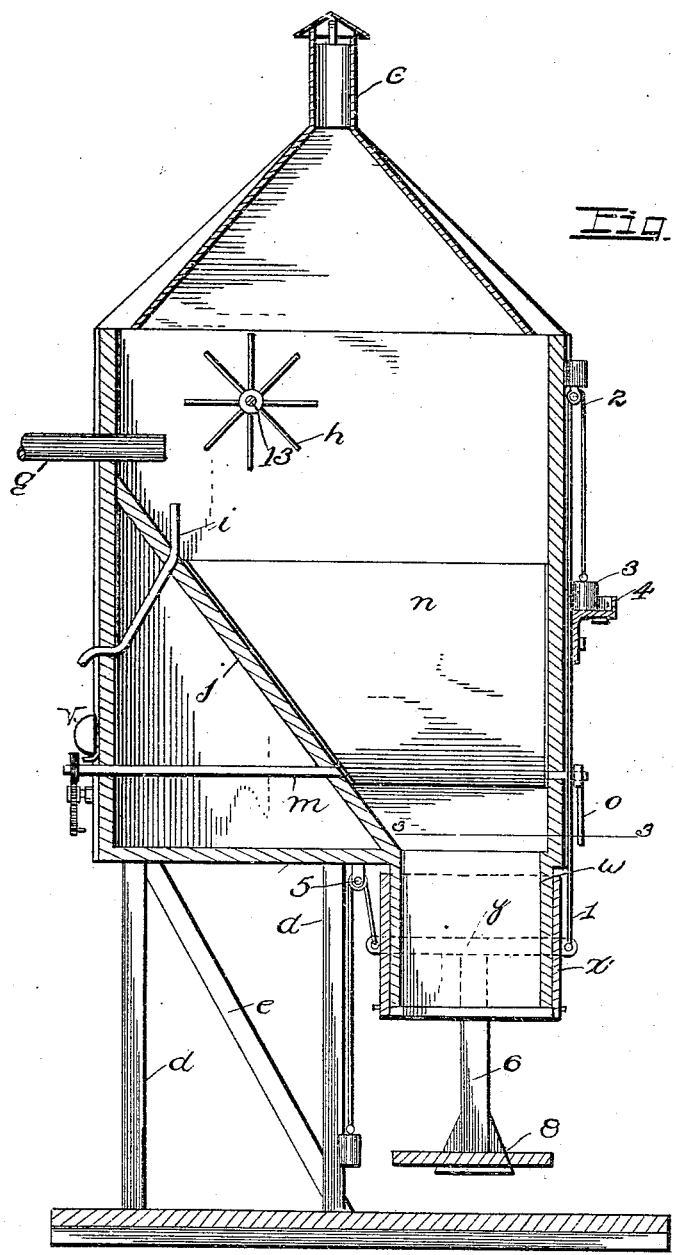
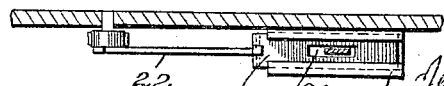

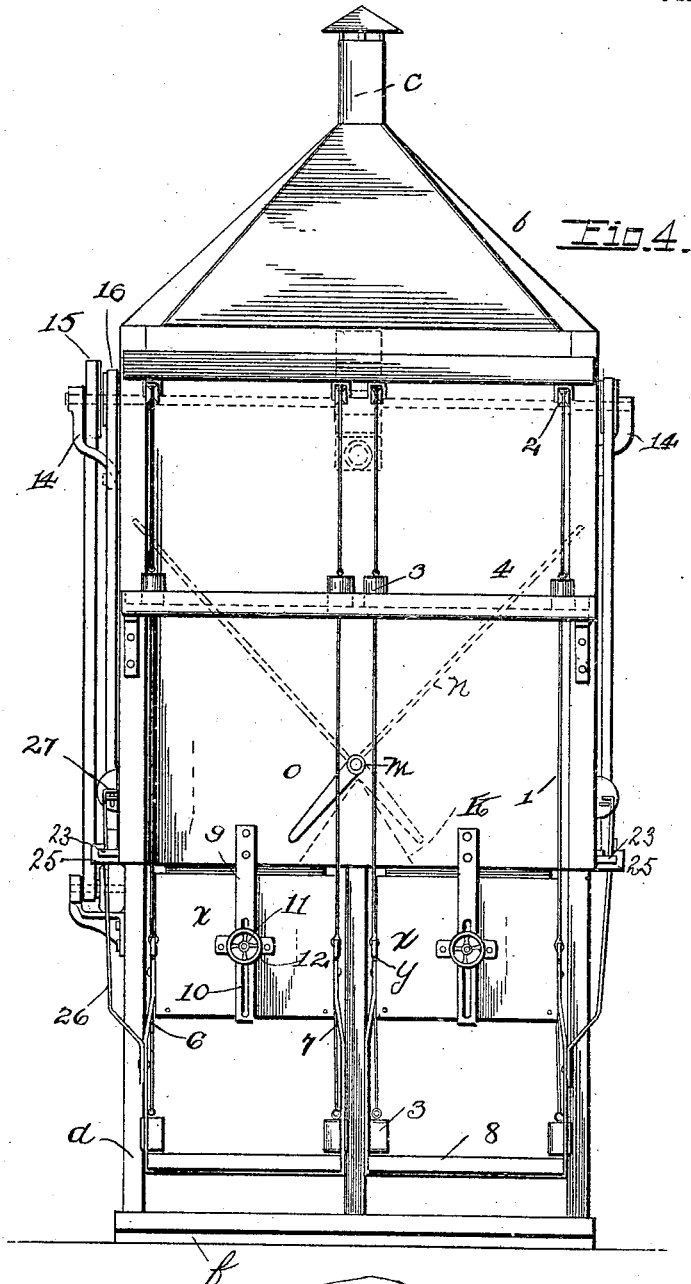

UNITED STATES PATENT OFFICE.

JAMES BROUSSARD, OF LOREAUVILLE, LOUISIANA.

COTTON-SEED PACKER.

951,051. Specification of Letters Patent. Patented Mar. 1, 1910.

Application filed October 15, 1908, Serial No. 457,945. Renewed October 14, 1909. Serial No. 522,613.

*To all whom it may concern:*

Be it known that I, JAMES BROUSSARD, a citizen of the United States, residing at Loreauville, in the parish of Iberia and State of Louisiana, have invented certain new and useful Improvements in Cotton-Seed Packers; and I do hereby declare the following to be a full, clear, and exact description of the invention, such as will enable others skilled in the art to which it appertains to make and use the same.

My invention relates to improvements in cotton seed packers, and the object of my invention is to provide a simple and economical apparatus whereby cotton seed as it comes from the gins is delivered into bags, each containing a certain weight of seed, and whereby a record of the whole amount packed is kept. It is not restricted to this use, however, as it may be used generally for packing purposes.

With this object in view, my invention consists in the construction and combinations of parts as hereinafter described and claimed.

In the accompanying drawings—Figure 1 is a side elevation of my invention. Fig. 2 is a vertical section thereof. Fig. 3 is a section on the line 3—3 of Fig. 1. Fig. 4 is an end view of the complete invention, and Fig. 5 is a side view showing the recording devices.

The apparatus consists of a hollow body $a$, usually made of wood, and surmounted by a conical hood $b$, terminating in a chimney $c$ having outlets near its top for the escape of dust. The body $a$ is supported by upright beams $d$ and braces $e$ on a base $f$.

Referring to Fig. 2, $g$ represents the seed pipe through which the seed is blown with considerable force from the gin against the blades of a fan $h$, a blast of air from the pipe $i$ passing upwardly through the seed as it leaves the pipe $g$, and driving the dust upward through the chimney $c$. Underneath the pipe $g$ is an inclined partition $j$ which directs the seed as it falls, after striking the blades of the fan $h$, toward the bottom of the apparatus, where it falls upon an inclined triangular partition piece $k$, shown in dotted lines in Fig. 4. By this partition piece, it is diverted to one of the two outlets at the bottom of the body $a$.

$m$ represents a rod journaled in the sides of the apparatus and passing just over the top of the partition piece $k$. This rod has firmly attached to it a swinging valve $n$, which may be swung into either of the two positions shown in dotted lines in Fig. 4, to direct the seed into one or the other of the outlets. Attached to one end of the rod $m$ is a handle $o$, by which the valve $n$ may be swung from one position to the other. The opposite end of the rod $m$ has pivotally connected to it an operating pawl $p$ and a retaining pawl $q$, which are adapted to engage the toothed wheel $r$ mounted on the pin $s$ journaled in one side of the body $a$. The wheel $r$ is provided with a pin $t$, adapted to engage a lever $u$, which operates the bell $v$ once for every complete revolution of the wheel $r$. This wheel $r$ has attached to it a disk divided off by a scale, as shown in Fig. 5, which indicates how much seed has passed through the apparatus, which is usually arranged to weigh four tons on every complete revolution of the wheel $r$, and to give an alarm by means of the bell $v$ every time four tons have been packed.

On either side of the partition piece $k$, the body $a$ is provided with a rectangular discharge spout $w$. Around this spout slides a rectangular bag holder $x$, to which the bag is adapted to be fastened to receive the seed. The bag holder $x$ has fastened to it on each side a stout brace $y$, preferably made of metal, and to each end of each of these braces is attached a cord such as 1, which passes over a pulley such as 2, terminating in a weight 3. Four of these pulleys and weights are arranged for each bag holder, one near each corner thereof. The upper weights such as 3 are limited in their downward movement by a bracket 4 extending across the end of the apparatus, while the pulleys 5 for the other weights are supported on studs projecting from the bottom of the body $a$. To the sides of the bag holders $x$ are firmly attached downwardly projecting arms 6 and 7, preferably made of metal, which arms carry at their lower ends a platform 8. To one end of the apparatus and extending down centrally over each bag holder, is an arm 9, perforated as shown at 10, and through the perforation in this arm extends a bolt 11 provided with a hand wheel 12, and suitable washers (not shown) whereby by turning the wheel 12 the bag holder will be guided, and, if desired, caused to be frictionally retarded in its descent.

The shaft 13 of the fan $h$ projects through the sides of the body $a$ and is supported by bent brackets 14. Mounted on one end of the shaft 13 are two pulleys 15 and 16. A belt 17 runs over the pulley 15 and down over a pulley 18 on the fan blower 19, which connects with the tube $i$, which is arranged to blow air through the seed as it enters the body $a$. Over the pulley 16 runs a belt 20, and this belt also runs over a disk 21 journaled on the lower part of the body $a$. This disk is provided with a pitman 22, which carries on its other end a sliding plate 23, which is slotted as shown at 24 and which is supported in guides 25 on the body $a$. Fastened to the arm 6 is an upwardly projecting arm 26, bent outwardly as shown in Fig. 4 and terminating at its upper end in a hook 27, which is adapted to engage a lever 28 for operating a bell 29. The arm 26 passes upwardly through the slot 24 in the plate 23. As the disk 21 is rotated rapidly by the belt 20, it reciprocates the arm 26 rapidly, thereby shaking the bag holder $x$ and the bag fastened thereto, causing the seed to be thoroughly packed into the bag. The reciprocation of the arm 26 is so rapid that the bag holder and platform cannot fall without the end 27 of said arm engaging the lever 28, and owing to this reciprocation the end 27 of the arm 26 as it is being drawn up by the weights 3 is enabled to pass by the lever 28. It is obvious that when the bag holder falls, as it does when enough grain is delivered into the bag to overbalance the weights 3, the platform 8 will fall, ringing the bell 29, thereby giving notice to the operator that the lever $o$ should be shifted.

The construction of the two bag holders and corresponding devices on the sides and end of the appartus is exactly similar.

The operation is as follows:—The apparatus being started, the seed is blown in with considerable force through the pipe $g$ against the fan $h$. This by means of the connections described rotates the fan blower 19, causing an upward blast of air through the pipe $i$, which blows the dust out through the chimney $c$. From an ordinary ginning plant, the seed is blown in against the fan $h$ with a force great enough to cause the revolution of the fan blower 19 at the rate of one hundred and fifty revolutions a minute. The seed is delivered into a bag (not shown) attached to one of the bag holders, until the weight of the seed and the bag overbalances the weights 3. The bag holder then falls, sounding the bell 29, whereupon the operator swings the handle $o$ from the position shown in full lines in Fig. 4 into the position shown in dotted lines in said figure and the seed is delivered into the bag on the companion holder. The first bag is then removed, tied up, and a fresh bag put upon the first bag holder, whereupon the operation is repeated indefinitely. Every time the lever $o$ is shifted, it operates the wheel $r$ a certain distance proportional to the weight of the seed received into each bag. When the wheel $r$ has made a complete revolution, it sounds the bell $v$, indicating to the operator that four tons of seed (or whatever amount the apparatus is arranged for) has been delivered into the bags.

While I have thus described my invention, I wish it to be distinctly understood that I do not limit myself to the exact features described in the specification and shown in the drawing, as these might be varied considerably without departing from the spirit of my invention.

I claim:—

1. In a device of the character described, the combination of a casing, a bag holder, means for delivering into said casing a blast carrying the material to be delivered into the bag, and means for shaking said bag holder operated by said blast, substantially as described.

2. In a device of the character described, the combination of a casing, means for delivering into said casing a blast carrying the material to be delivered into the bag, a bag holder, supports therefor allowing the bag holder to fall a predetermined distance, and means for shaking said bag holder operated by said blast, substantially as described.

3. In a device of the character described, the combination of a casing, means for delivering into said casing a blast carrying the material to be packed, a counterbalanced bag holder, means for shaking said bag holder operated by said blast, and an alarm operated by said bag holder as it falls when the bag is filled, substantially as described.

4. In an apparatus of the character described, the combination of a casing provided with means through which a blast carrying the material under treatment is admitted into said casing, and also provided with discharge openings, a counterbalanced bag holder under one of said openings, and means operated by said blast for shaking the bag holder, substantially as described.

5. In a device of the character described, the combination of a casing provided with an inlet pipe through which the blast carrying the material under treatment is admitted into said casing, and also provided with discharge openings, a counterbalanced bag holder under one of said openings, supports therefor, allowing the bag holder to fall a predetermined distance, and means for shaking said bag holder operated by said blast, substantially as described.

6. In an apparatus of the character described, the combination of a casing provided with a plurality of delivery openings near its bottom, a pipe delivering the material to be treated into said casing, a fan adapted to be oprated by the material forced in through said pipe, a counterbalanced bag holder arranged in proximity to each of said delivery openings, each of said bag holders being provided with an upwardly projecting arm, and means for continuously shaking said bag holders by the operation of said fan, including a slotted plate encircling said arm, a crank pivotally connected to said plate, a disk on which said crank is mounted, and connections whereby the rotation of said fan causes the rotation of said disk, substantially as described.

7. In a device of the character described, the combination of a casing provided with delivery openings near its bottom, a pipe delivering the material to be treated into said casing, a fan adapted to be operated by the stream of material forced in through said pipe, a counterbalanced bag holder arranged in proximity to each of said delivery openings, each of said bag holders being provided with an upwardly projecting arm, a bell adapted to be operated by the downward movement of said arm, a perforated plate through which said arm passes, and connections whereby the rotation of said fan causes the reciprocation of said plate, thereby continuously shaking said bag holder, substantially as described.

In testimony whereof, I affix my signature, in presence of two witnesses.

JAMES BROUSSARD.

Witnesses:
  Joe Huyonin,
  W. J. Emmer.